United States Patent [19]

Tkatchouk

[11] Patent Number: 6,009,870
[45] Date of Patent: Jan. 4, 2000

[54] APPARATUS FOR PRODUCING A GAS MIXTURE FOR HYPOXIA TRAINING

[75] Inventor: Elena Nikanorovna Tkatchouk, Moscow, Russian Federation

[73] Assignee: Elena Valerievna Tkatchouk, Moscow, Russian Federation

[21] Appl. No.: 08/952,994

[22] PCT Filed: Sep. 2, 1996

[86] PCT No.: PCT/RU96/00249

§ 371 Date: Aug. 31, 1998

§ 102(e) Date: Aug. 31, 1998

[87] PCT Pub. No.: WO98/09676

PCT Pub. Date: Mar. 12, 1998

[51] Int. Cl.[7] .................................................. A61G 10/00
[52] U.S. Cl. .............................. 128/202.12; 128/205.11; 128/205.12
[58] Field of Search ................. 128/205.12, 202.12, 128/205.11, 205.26; 96/10

[56] References Cited

U.S. PATENT DOCUMENTS

| | | | |
|---|---|---|---|
| 859,156 | 7/1907 | Warnken | 128/205.26 |
| 1,224,180 | 5/1917 | Lake | 128/205.26 |
| 2,920,622 | 1/1960 | Steel | 128/205.26 |
| 3,422,008 | 1/1969 | McLain | 96/10 |
| 3,680,557 | 8/1972 | Doniguian | 128/205.26 |
| 3,794,468 | 2/1974 | Leonard | 96/10 |
| 5,101,819 | 4/1992 | Lane | 128/205.26 |
| 5,207,623 | 5/1993 | Tkatchouk et al. | 482/61 |
| 5,383,448 | 1/1995 | Tkatchouk et al. | 128/205.12 |
| 5,467,764 | 11/1995 | Gamow | 128/202.12 |
| 5,799,652 | 9/1998 | Kotliar | 128/205.26 |
| 5,850,833 | 12/1998 | Kotliar | 128/202.12 |

FOREIGN PATENT DOCUMENTS

| | | | |
|---|---|---|---|
| 640952 | 6/1992 | Australia . | |
| 1456161 | 2/1989 | U.S.S.R. | 128/202.12 |
| 2004261 | 12/1993 | U.S.S.R. | 128/202.12 |

*Primary Examiner*—Aaron J. Lewis
*Attorney, Agent, or Firm*—Kane, Dalsimer, Sullivan and Levy, LLP

[57] ABSTRACT

The present invention relates to equipment for producing a hypoxia gas mixture and for use during hypoxia training at regular intervals. The present invention may be used in the field of practical medicine during a therapy involving gas mixtures with a low oxygen content. This invention essentially relates to an apparatus for producing a gas mixture for hypoxia training at regular intervals, wherein said apparatus comprises the following elements serially connected: a compressor; a gas-distribution member made of hollow polymeric fibers of poly-4-methylpentens-1; a duct with a flow-meter; a moisturising unit; a patient mask with a breathing valve; a system for automatically controlling the operation mode parameters, wherein said system comprises a patient-condition monitoring device with an oxygen indicator and a spirometer; and a drying unit mounted before the gas-distribution member. This drying unit is made in the shape of two truncated cones which are connected together at their larger bases on a single support rod, wherein said rod comprises in its central part a disc having a diameter 4 to 6 times larger than that of said rod. Hollow fibers made of mixtures of poly-4-methylpentens-1 with different melt index are wound on the last cone.

5 Claims, 2 Drawing Sheets

APPARATUS FOR PRODUCING A GAS MIXTURE FOR HYPOXIA TRAINING

FIELD OF ART

This invention relates to apparatus for production of hypoxic gas mixture to be used in interval hypoxic therapy and can be used in practical medicine while treating diseases with gas mixture of lower oxygen content.

BACKGROUND OF THE INVENTION

In modern medicine have been spread the medical method based on activation of inner protective force of human body and its physiological reserves using no medicaments. One of this methods is interval hypoxic therapy which increases the resistance of human body in various pathological states resulted from preliminary therapy with oxygen insufficiency. In order to carry out interval hypoxic therapy the specific facilities should be developed.

There is installation for hypoxic therapy to be conducted, which comprises free air compressor, gas separating element made as hollow polymeric fibres, flowmeter, humidifier and chamber furnished as a room supplied with hypoxic gas mixture where the patient is placed to. The installation is provided with system to control operating conditions and patient's state. (USSR Authorship certificate No. 1526688, published in 1989)

The main deficiency of this installation is impossibility of strict measuring of hypoxic gas mixture (HGM), HGM concentration to chamber, eliminating the opportunity to select individual patient breathing program, that reduces treatment efficiency thereby.

There is also an installation for production of gas mixture to be used for interrupted at barometric pressure hypoxic therapy and which comprises connected in series membrane compressor, gas separating element made on the basis of hollow polymeric fibres of poly-4-methylpentene-1, pipeline with flowmeter, humidifier and means to be connected to patient as well as system to control operating conditions and patient's state. In this case the installation is additionally furnished with filter element, the operating conditions control system is automatic, the patient condition controlling means are accomplished as oxygen measuring element and means to be connected to patient as face-mask with check valve. (EP, No. 0472799A1, published 1992).

The main deficiency of this installation is insufficient productivity of gas separating element and its short service life.

DISCLOSURE OF INVENTION

The task to be solved in this invention is connected with increasing productivity of gas separating unit and service life of installation.

The task in question is solved by installation to produce gas mixture for internal hypoxic therapy that comprises connected in series compressor, gas separating element made of hollow polymeric fibres based on poly-4-methylpentene-1, pipeline with flowmeter, humidifier, face-mask of patient, automatic system to control operating conditions along with means controlling patient condition that furnished with oxygen measuring element and spirometer and dehumidifier placed before gas separating element and what's more, the latter is accomplished as two truncated cones connected together by big bases on a single support bar which is furnished, in its middle part, which disk of diameter of 4–6 diameters of support bar, and what's more the support bar is wrapped around by hollow fibres made of a mixture of poly-4-methylpentene-1 that have different melt indexes.

According it this invention, the support bar is wrapped around with the hollow fibres made a mixture of poly-4-methylpentene-1 with melt index being 100–180 g/10 min taken in quantity of 75–95% mass and with melt index being 20–5 g/10 min taken in quantity of 5–25% mass of fibre mass. In this case the compressor and spirometer can be mounted inside the body of installation or out of it. The preferable embodiment of dehumidifier has been carried out as filter cartridge filled up with silica gel.

Character of invention is to fabricate an original design of gas separating element which consists of two truncated cones connected together by big bases and interlocked on a single support bar. In the middle part of said bar the metal disk of certain size is placed. The thickness of layer of fibres wrapped around gas separating element will be decreasing in direction from smaller cone bases to big base, i.e. to the middle of element. In this case the resistance to discharging gas flow, permeated into interfibres space, will be lesser that finally causes the increasing of specific productivity of gas separating element as well as the service life of installation as a unit.

According to data obtained during test of construction applied, the specific productivity of gas increases by 10–14% as compared with known membrane module.

The size of a disk placed in the middle of support bar, has been determined experimentally, and its diameter is of 4–6 diameters of support bar and stipulated by necessity to create optimal thickness of fibres' layer in the middle of membrane module in which gas flow faces minimum pressure loss.

According to invention proposed hereby, hollow polymeric fibres are wrapped around support bar. Hollow fibres bend around outer rim of disk and form a space.

Since the number of hollow fibres placed in cross-section of membrane module on disk and in the region of epoxide block are equal and the thickness of layer of fibres placed in these cross-section is inversely proportional to square of diameters (owing to equality of surfaces), the thickness of fibres' layer on disk will lesser of that in the region of epoxide block providing minimum pressure loss of fibres' layer to gas flow. The support bar is wrapped around with mixture of poly-4-methylpentene-1 having different indexes of melt flow, so called melt indexes which are as follows:

75–95% mass of polymer mixture is taken having melt index of 100–180 g/min;

5–25% mass of polymer mixture is taken having melt index of 20–50 g/10 min.

The mixture of these polymers is used to form hollow fibres to be wrapped up.

Availability of mixture of polymers in fibre causes optimal viscosity characteristics of initial raw material and enables to eliminate structural defects of fibres produced and provides uniform thickness of fibres along the whole their length. Permeability of fibres produced is by 5–10% higher compared with known accounting same selectivity of gas separation.

Use of gas separating element described above and wrap around of polymeric fibre of composition indicated above gives the opportunity to increase considerably the gas productivity of installation by 15–20% in particular.

This advantage enables, besides, to increase service life providing specific consumption of HGM being more than 15 l/min per one patient. In real practice when using gas separating element described above, the installation services four patients simultaneously that corresponds to its service life.

THE BEST VERSION OF EMBODIMENT OF THE INVENTION

Figure 1:
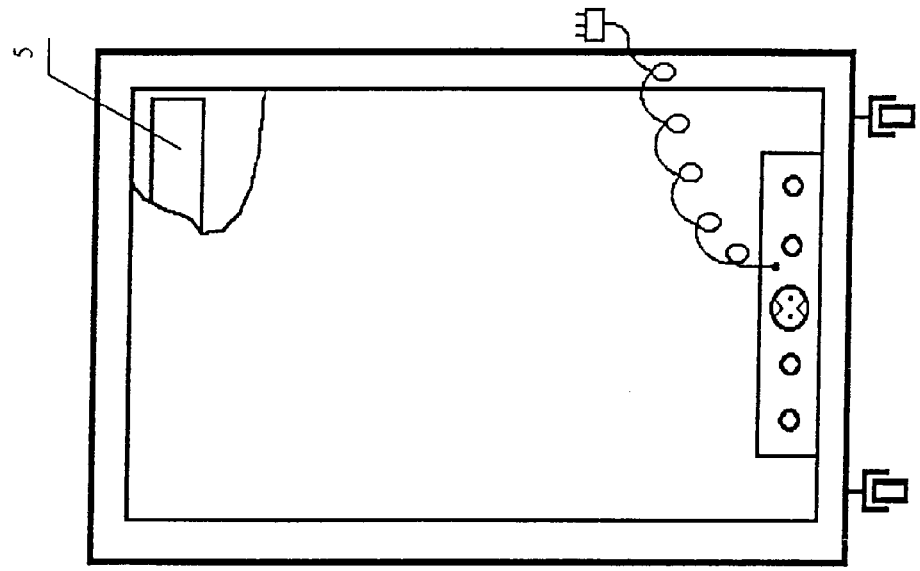
FIG. 1 is diagram of installation to produce gas mixture to be used for interval hypoxic therapy with no cover of body.
Figure 1:
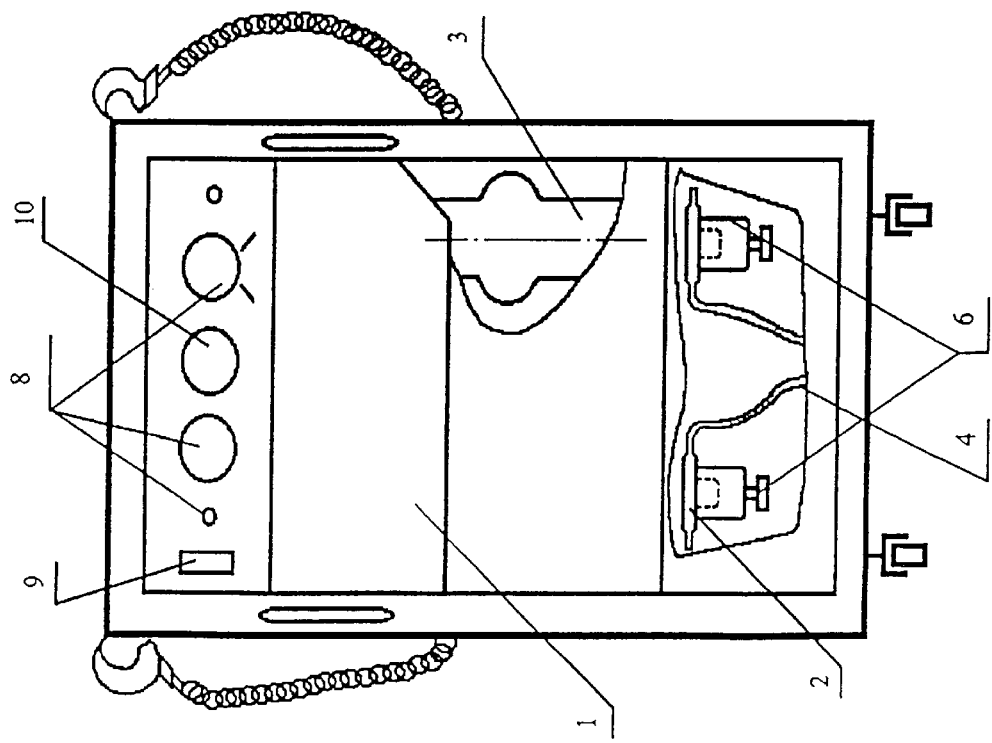

The installation for production of gas mixture to be used for interval hypoxic therapy and shown in FIG. 1, consists of compressor 1, filter-dehumidifier 2, gas separating element 3, pipeline 4, flowmeter 5, humidifier 6, patient's face-mask with valve to breath 7, automatic system to control operating conditions 8, means to control patient condition with oxygen measuring element 9, spirometer 10.

Figure 2:
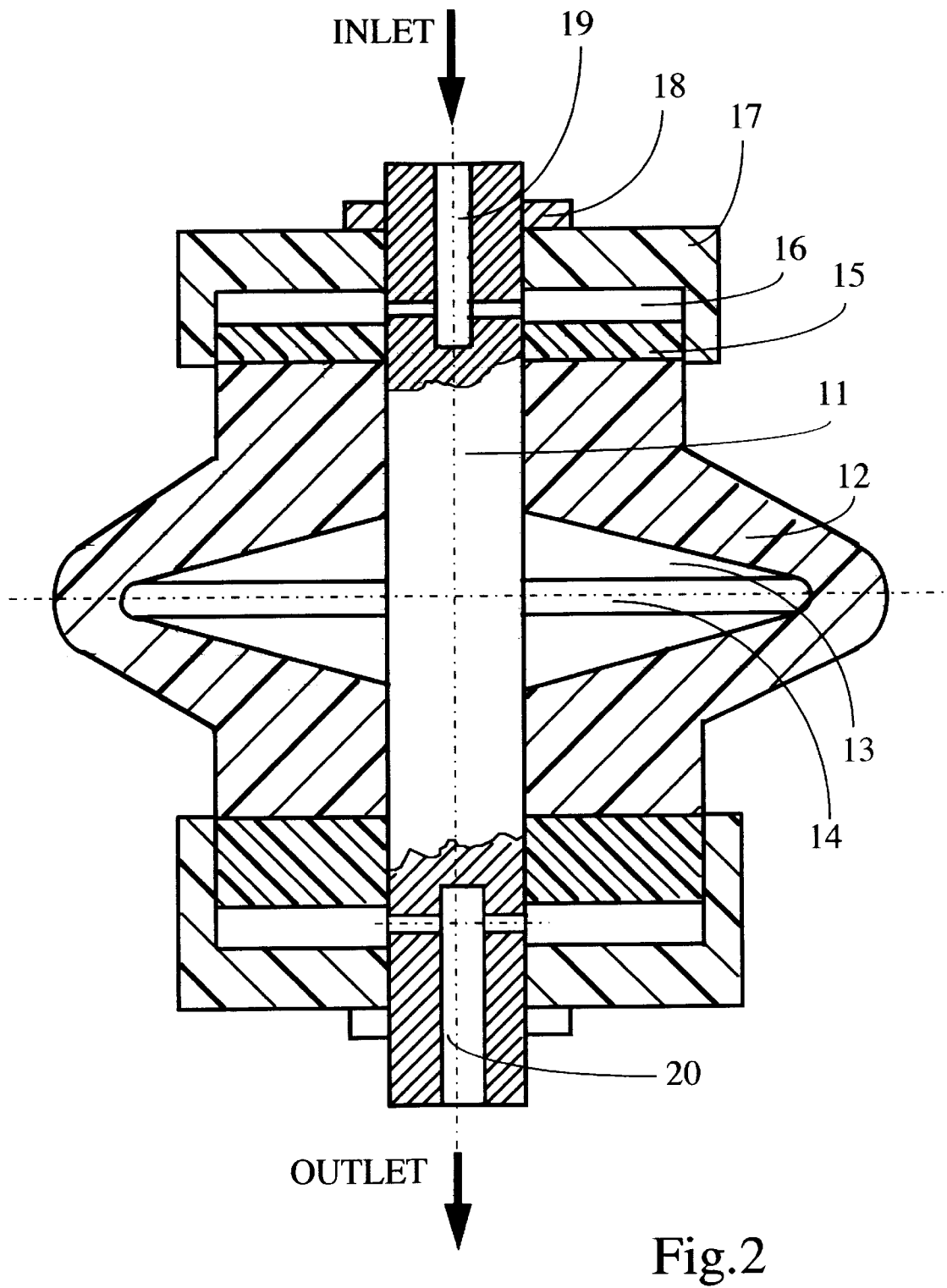
FIG. 2 shows frontal cross-section of gas separating element.

Gas separating elements 3, shown in FIG. 2, consists of bar 11, layer of hollow polymeric fibres 12, space 13, disk 14, epoxide block 15, sealed chamber 16, covers 17, nuts 18, inlet gas channel 19, outlet gas channel 20.

Capability of invention to be realized is confirmed by following concrete Examples.

EXAMPLE 1

Gas separating element, shown in FIG. 2, is fabricated as following: Bar 11 with disk 14 placed on it, is placed into fastening of winding machine and started rotating. In parallel to bar, the placer, through the holes of which running hollow polymeric fibres fixed to rotating bar, is accomplishing recip-rotating motor. Fibres are reeling out from bobbins. In such a way the cross-shaped placing of hollow fibres' bundle 12 around bar of membrane module 11, is carried out, moreover, the angle between the coils of fibres' bundle running there and back is keeping to be 90 degree. Simultaneous to winding of layer of hollow fibres 12, the epoxide block 15 are formed. For this purpose the epoxide compound is continuously applied to the ends of winding membrane module and rolling down of these spots facilitates impregnation of interfibres' space and cementing of fibres together. When winding the hollow fibres 12 bend around outer rim of disk 14 forming a space 13. After winding required numbers of hollow fibres 12 and full hardening of epoxide compound in block 15, cut of the fibres of module ends is carried out, moreover, the channels of hollow fibres are opened, then covers 17 are placed on the module ends and tightened with nuts 18. As a result two sealed chambers at inlet and outlet of module are formed.

EXAMPLE 2

Gas separating module is operated as follows: Compressed air from compressor 1 is supplied to one of the sealed chamber 16 via inlet gas channel 19 from which it reaches channels hollow fibres 12 based on poly-4-methylpentone-1. Running along said channels the air is depleted in terms of oxygen which penetrates throughout the fibres' walls reaching interfibres space and then environment. Nitrogenated air leaves fibre channel at the opposite end of module and enters the second sealed chamber 16 and runs as HGM to the patient to be breathed. Control of the compressed air pressure at inlet of membrane gas separating element 3 and HGM consumption at its outlet enables to obtain different degree of air enrichment with nitrogen.

EXAMPLE 3

The installation for production of gas mixture, to be used for interval hypoxic therapy, is operated as follows:

The initial air contained 21% vol. of oxygen and 79% vol. of nitrogen, in supplied into membrane, oil free compressor 1 where it is compressed up to 4 atm and then the air flow at rate of 60 l/min run through the filter-dehumidifier 2, made as cartridge and filled with celica gel, and further via inlet channel 19 of gas separating element 3, inside hollow polymeric fibres 12 formed of mixture of poly-4-methylpentene-1 having the melt indexes: 150 g/10 min taken in quantity of 85% mass and 40 g/10 min taken in quantity 20% mass of fibres mass. Fibres 12 have inner diameter of 26 µm and wall thickness of 15 µm and wall thickness of 15 µm. After air pass through gas separating element 3, the HGM produced, containing 10% vol of oxygen and 90% vol. of nitrogen, run through pipeline 4, flowmeter 5 and humidifier 6 to patient's face-mask 7 furnished with check valve to breathe. The installation is provided with automatic system to control breath parameters 8, means to control patient condition with measuring element to control oxygen concentration in mixture supplied to patient organism and with spirometer 10. Automatic system to control breath parameters 8 ensures automatic supply of HGM and control of individual program for patient breath.

Means for control of patient condition 9 is furnished except above mentioned, with pulsoximeter that enables doctor to carry out detailed control of patient condition.

EXAMPLE 4

8Treatment by using interval hypoxic therapy is carry out as follows:

During the first day of treatment the inhalation of HGM contained 90% vol of nitrogen and 10% of oxygen is accomplished 5 times a day in the course of 3 minutes each time with 3 minutes-interval to breathe free air. Total time of breathing HGM is 15 minutes.

During the second day the patient breathes HGM 6 times a day in the course of 3 minutes each time with 2 minutes-interval to breathe free air. Total time of breathing HGM is 18 minutes.

During the third day the patient breathes HGM 7 times a day in the course of 4 minutes each time with 2 minutes-interval to breathe free air. Total time of breathing HGM is 28 minutes.

During the fourth day the patient breathes HGM 8 times a day in the course of 4 minutes each time with 2 minutes-interval. Total time of breathing HGM is 32 minutes.

During the fifth day the inhalation with HGM is carried out 9 time a day in the course of 4 minutes each time with 2 minutes-interval to breathe free air. Total time of breathing HGM is 36 minutes.

During sixth day the patient breathes HGM 9 times a day in the course of 5 minutes each time with 2 minutes-interval to breathe free air. Total time of breathing HGM is 45 minutes.

During the seventh day the inhalation with HGM is carried out 10 time a day in the course of 5 minutes each time with 2 minutes-interval to breathe free air. Total time of breathing HGM is 50 minutes.

During the eighth day—11 time a day in the course of 5 minutes each time with 2 minutes-interval to breathe free air. Total time of breathing HGM is 55 minutes.

During the period from ninth day through eleventh day the inhalation with HGM is carried out 12 time a day in the course of 5 minutes each time with 2 minutes-interval to breathe free air. Total time of breathing HGM is 60 minutes.

During the twelfth day the inhalation with HGM is carried out 5 time a day in the course of 6 minutes each time with 2 minutes-interval to breathe free air. Total time of breathing HGM is 30 minutes.

During the thirteenth day the inhalation of HGM is carried out 6 times a day in the course of 6 minutes each time with 2 minutes-interval to breathe free air. Total time of breathing HGM is 36 minutes.

During the fourteenth day the inhalation of HGM is carried out 6 times a day in the course of 8 minutes each time with 2 minutes-interval to breathe free air. Total time of breathing HGM is 48 minutes.

During the fifteenth day the inhalation of HGM is carried out 7 times a day in the course of 8 minutes each time with 2 minutes-interval to breathe free air. Total time of breathing HGM is 56 minutes.

During the sixteenth day the patient is breathed 5 times a day in the course of 10 minutes each time with 2 minutes-interval to breathe free air. Total time of breathing HGM is 56 minutes.

During the seventeenth day—6 times a day in the course of 10 minutes each time with 2 minutes-interval to breathe free air. Total time of breathing HGM is 60 minutes.

During the period from eighteenth day through twentieth day the patient breathes 6 times a day in the course of 10 minutes each time with 2 minutes-interval to breathe free air. Total time of breathing HGM is 60 minutes.

After twenty days of treatment the breathing with hypoxic gas mixture is carry out 3 times a week, 3–6 times a day in the course of 10 minutes each time depending on patient's health condition. In this case the interval for breathing free air will be 2–3 minutes. These treatment cycles are carried out in the course of 2 weeks. Then they should repeated in the course of one more week under same condition. In 3–4 months the full course of treatment should be repeated once more.

Industrial Practicability

Method for interval hypoxic therapy, carrying out in proposed installation, has been proved and can bee recommended as treatment for chronic diseases of cardiovascular system including ishemic heart disease, postinfarctional cardiosclerosis, hypertension of 1–2A degree, neurocirculatory dystonia, bronchial asthma, allergy, hypoplactic and irondeficiency anaemia, disturbance of carbohydrate, fat and protein metabolism, increasing productivity and immunity to extreme factors of environment including side effect of pharmacology.

Besides, dosage hypoxia can be applied to increase nonspecific resistance of organism while treating malignant tumour and protect patient organism from side effect of ionizing radiation when using radiotherapy.

Proposed installation for production of gas mixture to be used for interval hypoxic therapy has advantages as follows:

increased by 15–20% gas productivity;

higher reliability when operating and service life.

What we claim is:

1. An installation having a body for producing a gas mixture to be used for interval hypoxic therapy and which comprises the following elements connected in series:
   a) a compressor,
   b) a gas separating element in mating relationship with the compressor,
   c) a pipeline in mating relationship with the gas separating element,
   d) a humidifier in mating relationship with the pipeline,
   e) an automatic system connected to the gas separating element to control operating conditions along with means to control patient condition connected to an oxygen measuring element, a flowmeter and a spirometer,
   f) a patient face-mask comprising a breathing valve connected to the oxygen measuring element,
   g) a dehumidifier placed in mating relationship with said gas separating element wherein said gas separating element comprising two truncated cones each having a larger circular base and a smaller circular base, said cones connected together by their respective larger bases on a single support bar having a diameter and an enlarged-middle cross-section with a disk having a diameter of 4–6 times the diameter of the support bar, wherein the support bar is wrapped around by hollow fibres formed of a mixture of poly-4-methylpentene-1 having different melt indexes.

2. Installation as set forth in claim 1, wherein one of the a melt indexes is 100–180 g/10 min taken in quantity of 75–95% mass and another of the melt indexes is 20–50 g/10 min taken in quantity of 5–25% mass of fibre mass.

3. Installation as set forth in claim 1, wherein the compressor and spirometer are placed inside the body of installation.

4. Installation as set forth in claim 1, wherein the dehumidifier comprises a filter cartridge filled with silica gel.

5. Installation as set forth in claim 1 wherein the compressor and spirometer are placed outside the body of installation.

* * * * *